United States Patent [19]

Reed et al.

[11] 4,253,325
[45] Mar. 3, 1981

[54] CALIBRATION OF TORQUE MEASURING TRANSDUCERS

[75] Inventors: Robert H. Reed, Lakewood; David F. Yagger, Sinclairville, both of N.Y.

[73] Assignee: Cummins Engine Company, Inc., Columbus, Ind.

[21] Appl. No.: 70,425

[22] Filed: Aug. 28, 1979

[51] Int. Cl.$^3$ ............................................. G01L 25/00
[52] U.S. Cl. ....................................................... 73/1 C
[58] Field of Search ................................... 73/1C, 139

[56] References Cited

U.S. PATENT DOCUMENTS

| | | | |
|---|---|---|---|
| 3,354,705 | 11/1967 | Dyer, Jr. ................................ | 73/1 C |
| 3,750,082 | 7/1973 | Peterson . | |
| 3,797,305 | 3/1974 | Haskell .............................. | 73/136 A |
| 3,827,293 | 8/1974 | Hohberg ............................. | 73/133 |
| 3,999,426 | 12/1976 | Sonderegger ....................... | 73/1 C |
| 4,090,393 | 5/1978 | Kharitonor et al. .................. | 73/1 B |

*Primary Examiner*—S. Clement Swisher
*Attorney, Agent, or Firm*—Sixbey, Friedman & Leedom

[57] ABSTRACT

A transducer calibrating assembly for calibrating the spindle transducers in a multiple spindle machine tool without the need for completely dismantling the machine to perform the calibration operation. The transducer calibrating assembly includes a torque coupling assembly 18 and a support coupling 20 which are connected by an articulated lever assembly 22 including a threaded shaft 26 a slide clamp 28 and a clamp shaft 24. Torque coupling assembly 18 includes a torque coupling 48 attached at a first socket to a master transducer housing 18, into which is inserted a spindle drive 5 of a spindle 3 on which is mounted the transducer to be calibrated. Support coupling 20 is attached directly to an adjacent spindle drive 5'. Leads 12 and 34 connect the transducer to be calibrated and the master transducer to measuring circuits 10 and 32, respectively. Measuring circuit 10 also includes variable resistors 148 and 150 to allow adjustments to be made in the measuring circuit of the transducer being calibrated. Before the calibration operation, air motor 7 is fixed, preferably by pinning and a known torque, which is measured by the master transducer and indicated on the readout display 36 of sensing circuit 32, is applied to spindle 3 by turning threaded shaft 26, which moves clamp shaft 24 about the rotational axis of spindle 3. This torque is maintained while the transducer is calibrated, after which the assembly is easily removed and is ready for attachment to another set of spindles.

14 Claims, 8 Drawing Figures

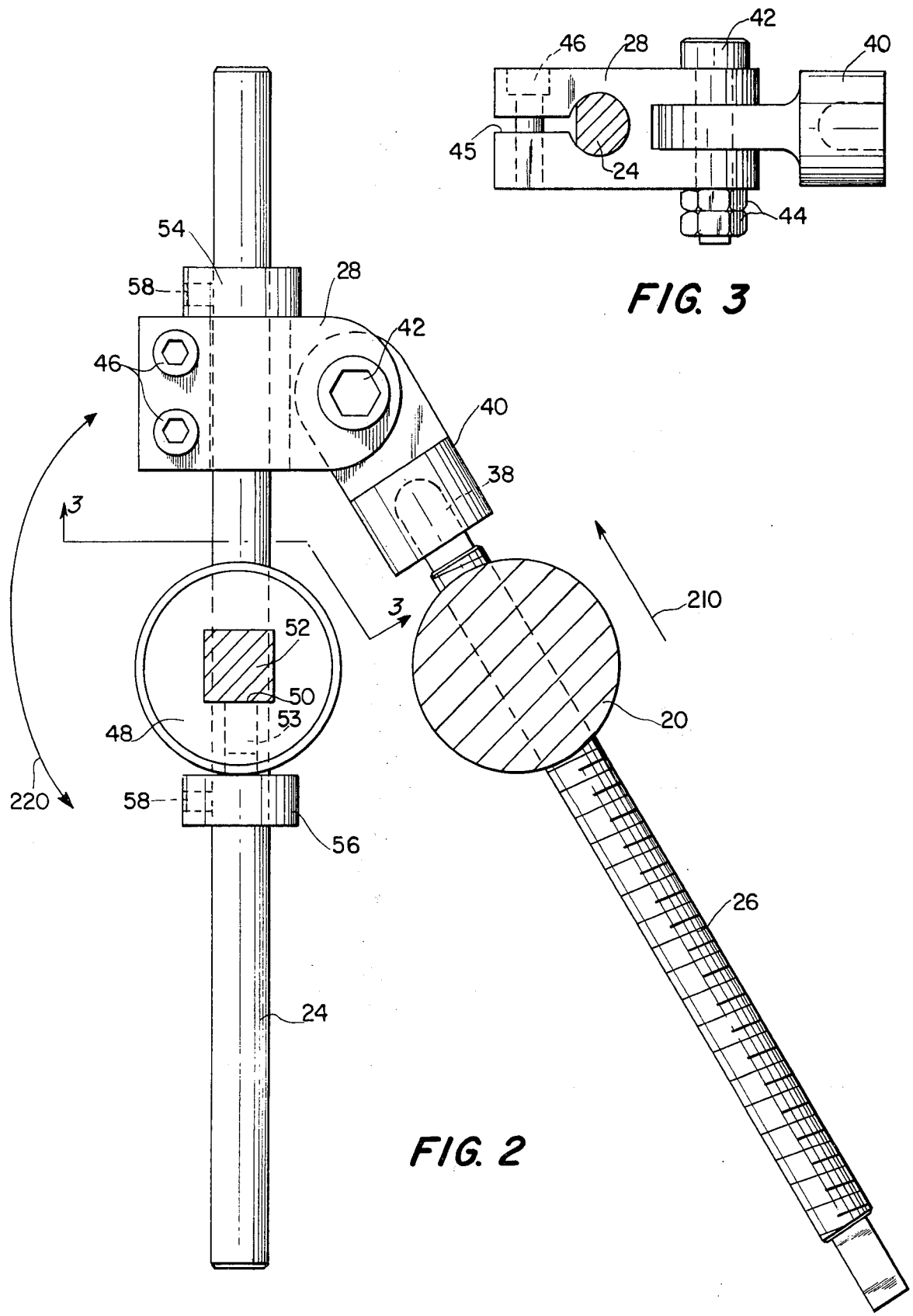

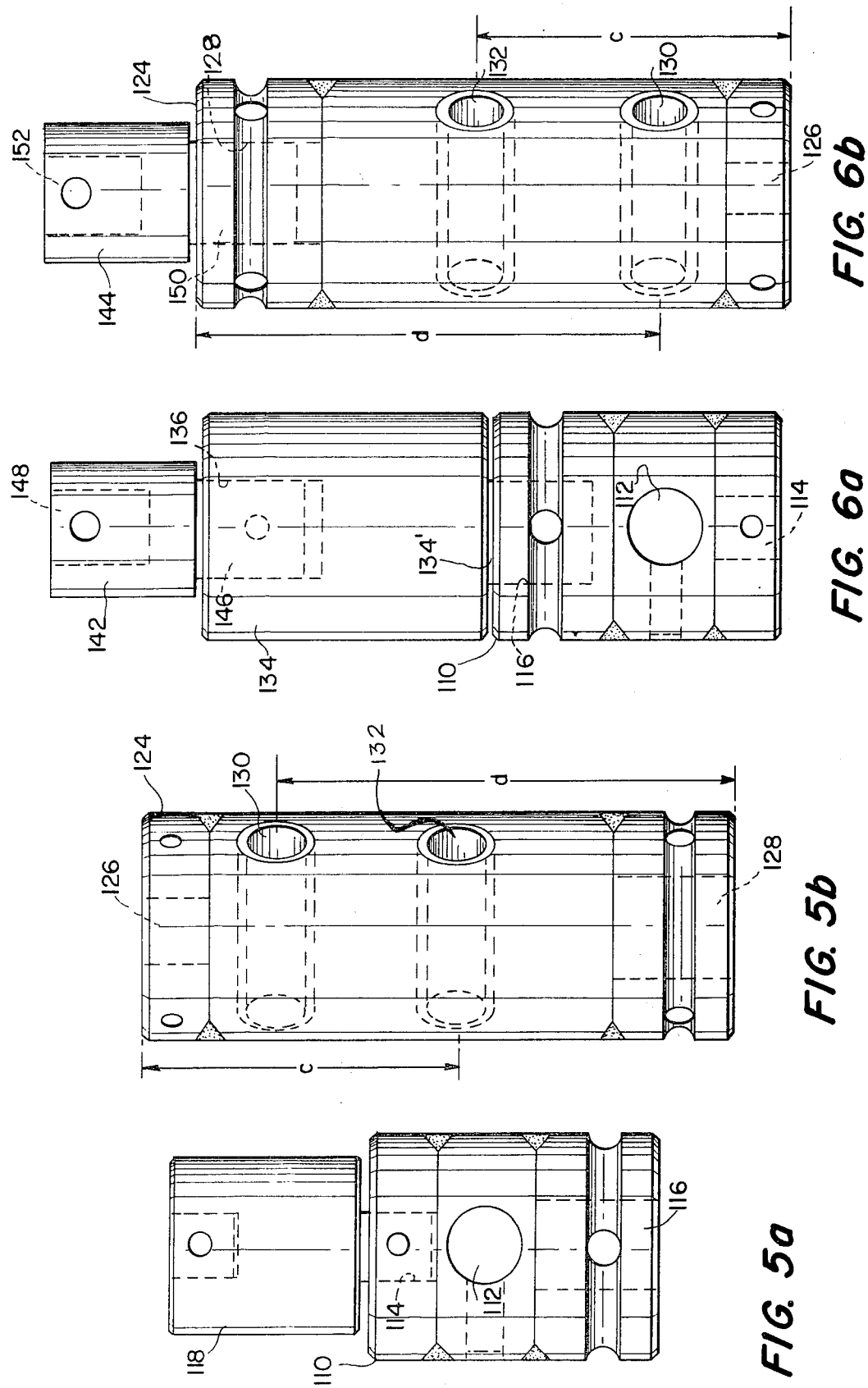

CALIBRATION OF TORQUE MEASURING TRANSDUCERS

TECHNICAL FIELD

The present invention relates to the calibration of torque measuring transducers and, specifically, to a method and an apparatus whereby a known torque may be applied to each spindle in a multiple spindle machine tool in order to calibrate the spindle torque transducers.

A torque measuring transducer, such as a spindle mounted strain gauge, tends over time to give false readings due to drift in the measuring circuit to which the transducer is attached. Inaccurate readings may also result from deterioration of the bonding between the transducer and its support and/or non-resilient deformation of the spindle due to stress cycling and the like. Periodic checking and calibration is, therefor, a prerequisite for reliable transducer operation. Since the spindle torque measurements are used to control the machine tool and to check proper operation, periodic calibration of the torque measuring transducer mounted on the spindle of the machine tool is vitally important to insure that the machine tool will function properly and with precision.

BACKGROUND ART

Calibration of a spindle mounted torque transducer normally involves the steps of applying a known torque to the spindle and adjusting the measuring circuitry and/or tranducer to produce an output reading corresponding to the known torque. Obviously, the accuracy of this method of calibration will depend, in large part, on the degree to which the applied torque can be accurately determined and controlled. Up to the present, the easiest way to apply accurately a known torque has been by means of a bench testing unit remote from the machine tool in which the spindle is mounted. Obviously, the machine tool must be at least partially dismantled to permit the spindle to be removed and placed in the bench testing unit for calibration. Following calibration, the spindles must then be reinstalled in the machine tool. The problems associated with this procedure are twofold. First, there is the likelihood of transducer damage after calibration to severe that the transducer is incapable of functioning at all. Although such damage might be detected before the spindle is reinstalled and the machine reassembled, the possibility exists that it would not, thereby necessitating a second dismantling of the machine tool, replacement of the damaged transducer and reassembly of the spindle in the machine tool. Second, there is the potentially more serious problem that, at some point between completion of the calibration on the bench testing unit and reassembly of the machine, the spindle will be bumped or jarred with sufficient severity that the calibration will be disturbed thereby causing inaccurate readings. Such an inaccuracy is not likely to be noticed even after the machine tool is put back into operation. Should the miscalibration resulting during the reassembly process be detected at a later time the machine tool will still have to be dismantled so the transducer can be recalibrated and reinstalled.

Hence, calibration of torque measuring transducers, essential to the optimum performance of machine tools, has been a time consuming and costly procedure. The importance of accurate calibration, however, has required that the process be carried out in the manner described above, despite the time and expense involved.

Any calibration technique which provided the necessary accuracy without requiring removal of the machine spindles would certainly provide a substantial cost advantage. A particularly difficult obstacle to overcome in the development of a practical "on machine" technique for calibrating spindle transducers is the need to accomodate different patterns of spindles within identical multiple spindle machine tools. For example, it is quite common for a manufacturing facility to have several identical multiple spindle machine tools for machining different articles of manufacture, wherein the spindles within each such machine tool are arranged in a unique pattern according to the requirements of the articles being machined thereby. An "on machine" calibration assembly suitable for one arrangement of spindles would not necessarily operate in an identical type of machine tool having a different arrangement of spindles. A more difficult obstacle to overcome occurs when different size and different models of multiple spindle machine tools are used within the same manufacturing facility, since the different work holders within such machines virtually rule out the use of such holders as a means for supporting a practical calibration assembly suitable for each one of the different type machine tools.

One example of an "on line" calibration device for a spindle mounted cutting tool is disclosed in U.S. Pat. No. 3,827,293. The apparatus disclosed therein is mounted on the machine bed and would therefor not be suitable for different types of machine tools. This patent discloses the use of a hydraulic cylinder and a piston which exerts a linear force on the cutting tool spindle and measures spindle deflection. Accordingly, a transducer calibrating apparatus similarly mounted on the work support surface of a multiple spindle torque unit would be useful only for one spindle at a time requiring a complicated dismounting and relocating procedure for each of the remaining spindles in the machine tool.

Other apparatus and methods for checking or calibrating force measuring instruments are disclosed in U.S. Pat. Nos. 3,750,082 to Provenzano et al.; 3,797,305 to Haskell and 4,090,393 to Kharitonov et al. However, none of these discloses a means for applying a known torque, as measured by a master transducer, to calibrate a transducer on a spindle. Moreover, none of these references discloses or suggests an apparatus or method which allows calibration of a transducer on a spindle within the machine where the spindle is located.

DISCLOSURE OF INVENTION

It is the purpose of this invention to provide a practical method and apparatus for calibrating a torque transducer without the drawbacks of the prior art as discussed above.

A specific object of the invention is to provide apparatus for calibrating a torque transducer mounted on a spindle of a machine tool while the spindle remains mounted within the machine tool.

Yet another object of this invention is to provide apparatus for calibrating a torque transducer mounted on a spindle of a multiple spindle machine tool wherein a known torque is applied to the spindle on which the torque transducer is mounted by connecting one part of the calibrating apparatus to an adjacent spindle on the same machine tool.

Still another object of this invention is to provide apparatus for calibrating torque transducers mounted on the spindles of a multiple spindle machine tool without substantial dismantling of the machine and without disturbing the pre-existing pattern in which the spindles are set up to carry out a specific machining step.

In accordance with the present invention an apparatus and method for calibrating a transducer on a spindle is provided comprising a torque applying lever assembly interconnecting a torque coupling assembly mounted on the spindle supporting the transducer being calibrated and a support coupling mounted on a spindle adjacent to the spindle on which the transducer being calibrated is mounted. This apparatus possesses the advantages of easy attachment to the spindle transducer being calibrated, needs no additional support structures and requires the removal of only the side panels of the torque unit for its operation.

The torque required for testing is applied by means of an articulated pair of levers including a first arm mounted by a torque coupling assembly to the spindle on which the transducer being calibrated is mounted and a second arm in the form of a threaded shaft pivotally connected at one end to the first arm and threadedly mounted to an adjacent spindle by a support coupling. This is particularly advantageous as it utilizes the spindles which are securely mounted to the machine to provide support for the force applying rod without the need for mounting the apparatus on the work holder of the machine. In addition, the use of a threaded rod, which may be any convenient length, as a torque applying lever facilitates the calibration of spindles in machines with wide variations in spindle configurations.

Further in accordance with the invention the torque coupling and a support coupling are formed with reversible coupling sockets to permit the calibration assembly to operate on machine tools having different sized drive couplings.

BRIEF DESCRIPTION OF THE DRAWINGS

The details of our invention will be described in connection with the accompanying drawings, in which:

FIG. 2 is a cross-sectional view taken along lines 2—2 of FIG. 1 and FIG. 4;

FIG. 3 is a cross-sectional view taken along lines 3—3 of FIG. 2;

FIGS. 5a, 5b, 6a and 6b illustrate in side elevation a feature of the present invention whereby the same couplings may be used on spindles with different size drives.

BEST MODE FOR CARRYING OUT THE INVENTION

Figure 1:
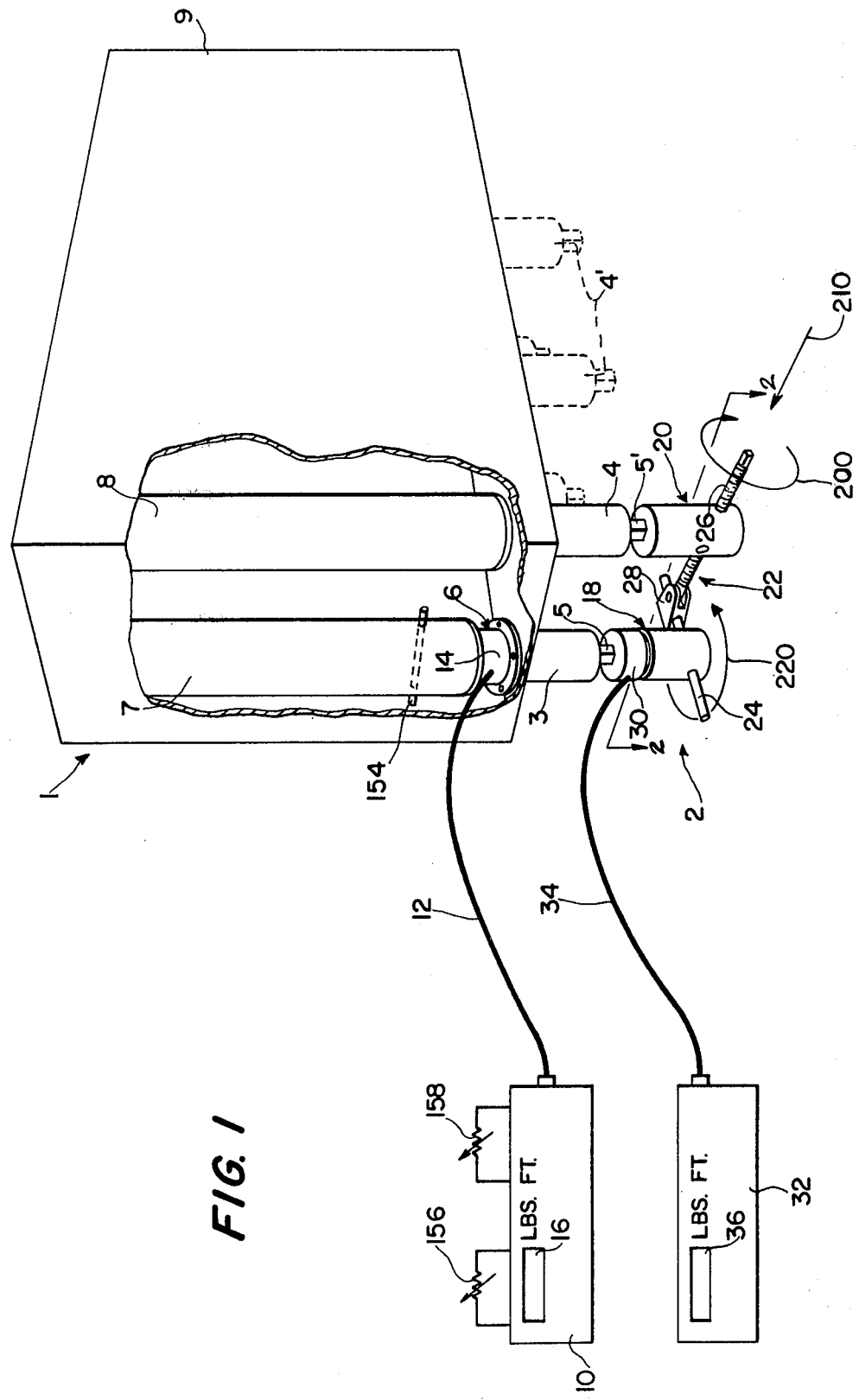
FIG. 1 is a partially cut away perspective view of a multiple spindle machine tool showing the transducer calibrating assembly of the present invention attached to two adjacent spindles.

Referring to the drawings, FIG. 1 illustrates a multiple spindle machine tool 1 showing the transducer calibrating assembly 2 of the present invention the operation of which will be described hereinafter. To understand the subject invention it should be noted that machine tool 1 is illustrated in a highly simplified form which includes only those portions of the machine tool which are involved during operation of the subject calibrating assembly 2. In particular, machine tool 1 is of the type which includes a plurality of spindles such as spindles 3 and 4 mounted on a machine frame (not illustrated) in a manner permitting the spindles to be repositioned relative to one another. A typical multiple spindle machine tool may have 12 or more such spindles as are schematically illustrated by dashed lines 4' in FIG. 1. As manufacturing requirements change, the spindles are repositioned relative to one another in accordance with a desired pattern of machining operation. For example, each spindle may be coupled by means of drive couplings 5 or 5' to a bolt engaging socket (not illustrated) for tightening bolts or capscrews to a prescribed torque value. To permit the same multiple spindle machine tool to operate on a different workpiece having a wide variety of shapes and sizes, each spindle is mounted for rotation in a journal 6 which may be repositioned and afixed to the machine frame as desired. Drive torque may be supplied to all spindles from a single source through a gear type drive train or each spindle may include its own air motor such as motors 7 and 8 connected with spindles 3 and 4, respectively. Surrounding all of the air motors and corresponding journals for the spindles is a removable machine housing 9. Although not illustrated, housing 9 may include one or more removable panels designed to give easy access to the spindle drive motors without necessitating removal of the entire housing 9 as would normally be required in order to remove each spindle from the machine tool when employing a conventional type bench test unit.

A torque transducer, not illustrated, is mounted on each spindle to measure the amount of torque supplied to the drive coupling 5 of that spindle by the corresponding air motor. Electrical measuring circuitry 10 is connected to each spindle mounted torque transducer by an electrical lead 12 and an electrical connector (not illustrated) extending between the stationary outer housing 14 of journal 6 and the spindle on which the transducer is mounted. To provide an operator with instantaneous torque readings for each spindle, measuring circuitry 10 may include a read out display 16 capable of providing a visible indication of the torque being supplied to the drive coupling of a particular spindle.

The calibrating assembly 2 which is the subject of this invention, includes essentially three major components: (1) a torque coupling assembly 18 for mating with and applying a known torque to a drive coupling 5 of a spindle supporting a transducer (2) a support coupling 20 for mating with the drive coupling 5' of a spindle adjacent the spindle on which the transducer to be calibrated is mounted and (3) an articulated lever assembly 22 including a clamp shaft 24 received in the torque coupling assembly 18 and a threaded shaft 26 hingedly connected to one end to clamp shaft 24 by means of a slide clamp 28 and received within a threaded bore of support coupling 20.

Torque coupling assembly 18 includes a master transducer housing 30 within which is mounted a master transducer, not illustrated, for determining precisely the amount of torque being applied to a spindle by the calibrating assembly. Electrical calibration circuitry 32 is connected to the master transducer by an electrical lead 34. A read out display 36 connected with electrical calibration circuitry 32 is designed to form a visual indication of the amount of torque actually being applied to a spindle by the calibrating assembly 2.

FIG. 2 is a cross section of the transducer calibrating assembly 2 of the present invention taken along lines 2—2 of FIG. 1. Threaded shaft 26 is secured to a spindle adjacent the one on which the transducer being calibrated is mounted by means of support coupling 20 through which shaft 26 is threaded. End 38 of threaded shaft 26 is rounded so that it may be received by a shaft adapter 40. As illustrated in FIGS. 2 and 3, shaft adapter 40 in turn is pivotally connected to slide clamp 28 by means of socket head shoulder screw 42 and jam nuts 44. Slide clamp 28 is formed with a keyhold slot 45 as shown in FIG. 3 to receive clamp shaft 24. Cap screws 46 secure the slotted end of slide clamp 28 to shaft 24. Clamp shaft 24 is inserted through both slide clamp 28 and a torque coupling 48 which forms the lower portion of torque coupling assembly 18. As will be explained in greater detail hereinbelow, torque coupling 48 includes a square recess 50 for receiving telescopically a downwardly projecting connector drive 52 integral with master transducer housing 30. The torque coupling 48 may be held on connector drive 52 by a set screw 53. Steel collars 54 and 56 include set screws 58 which enable slide clamp 28 to be positioned at variable distances along clamp shaft 24 from torque coupling 48.

Figure 4:
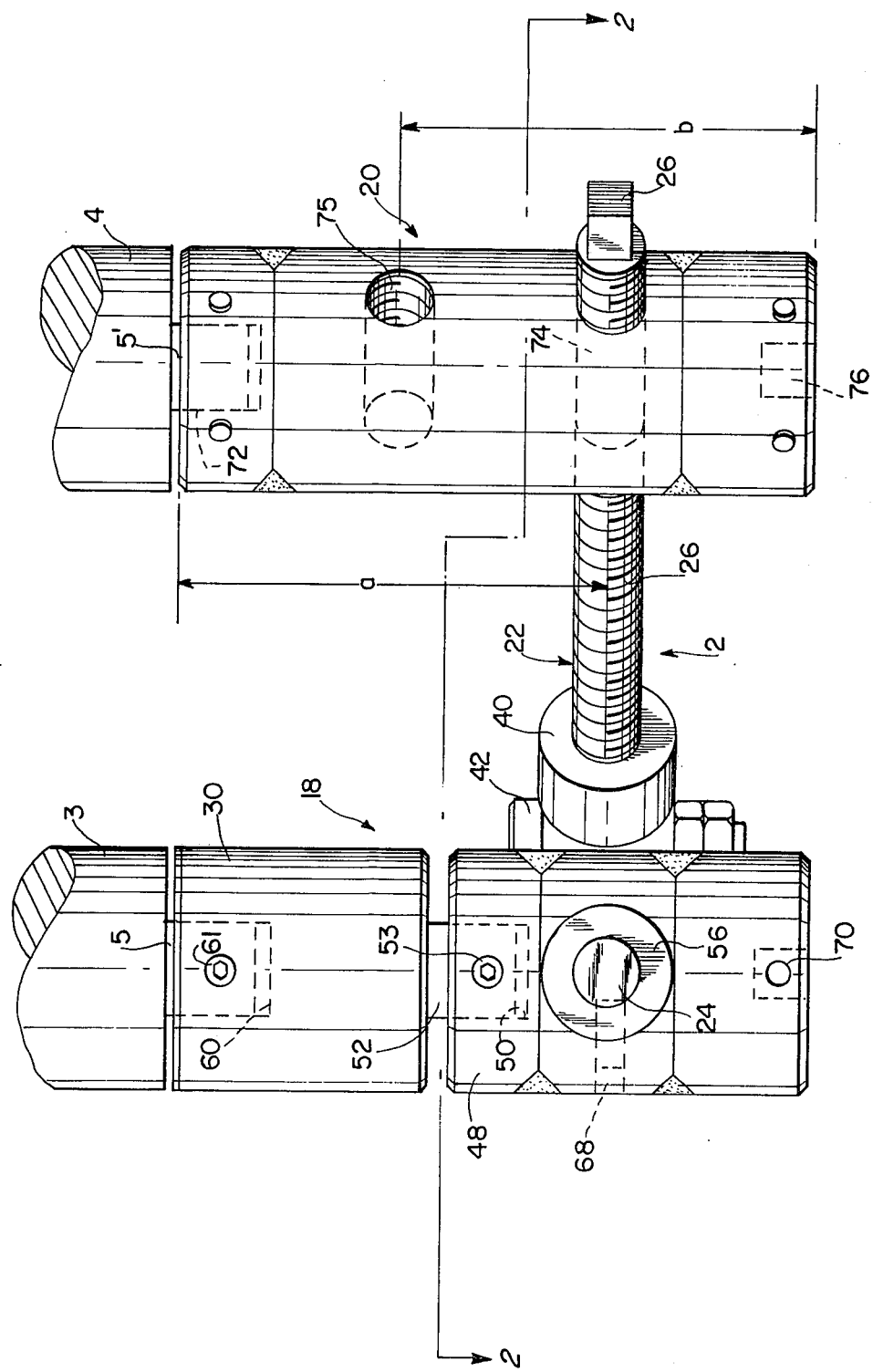
FIG. 4 is a partially cut away side elevational view of the transducer calibrating assembly of the present invention.

FIG. 4 is a side elevational view of the calibrating assembly 2 of the present invention particularly showing torque coupling assembly 18, and support coupling 20 connected by articulated lever assembly 22. Spindle 3 includes spindle drive 5 which is inserted into an upper socket recess 60 in master housing 30. Set screw 61 retains housing 30 on drive 5. As discussed above, master transducer housing 30 includes, on the end opposite upper socket recess 60, a connector drive 52 which is received by square recess 50 in torque coupling 48 and held in place by set screw 53. Clamp shaft 24 is further secured in torque coupling by set screw 68. Torque coupling 48 includes in addition a second socket 70, the purpose of which will be described hereinbelow. Spindle 4 includes spindle drive 5' which fits into a first socket 72 in the end of support coupling 20. Support coupling 20 also includes first and second threaded passages 74 and 75. Shaft 26 in threaded through passage 74 but may be switched to passage 75 as will be described below.

The torque and support couplings of the present invention are extremely versatile and may be used to calibrate transducers on spindles with drives ranging widely in size such as from ⅜ inch to one inch square. This versatility is due in large measure to the presence of different size sockets on the opposite ends of the couplings, which allows the same set of couplings to be used to calibrate the transducers on spindles having different size drives. Reference to FIGS. 4, 5 and 6 illustrates the manner in which this is achieved.

In FIG. 4, torque coupling 48 and support coupling 20 include on their upper surfaces first square recess sockets 50 and 72 which are identical in size themselves and the same size as spindle drives 5 and 5'. Torque coupling 48 and support coupling 20 additionally include on their lower surfaces second square recess sockets 70 and 76 which are also the same size but are different in size from first sockets 50 and 72. Second sockets 70 and 76 will receive drives of a different size than 5 and 5'. As previously described, first socket 50 of torque coupling 48 does not directly receive spindle drive 5 but receives instead connector drive 52 of master transducer housing 30, which is the same size as spindle drive 5. When torque calibrating assembly 2 of the present invention is installed to perform its calibrating function, threaded shaft 26 is threaded through threaded passage 74 and is positioned relative to torque coupling 48 so that all elements of the torque applying lever assembly 22 (shaft 26, shaft adapter 40, slide clamp 28 and clamp shaft 24) are aligned in the same plane, which is perpendicular to the rotational axes of spindles 3 and 4. It is essential to the proper operation of the transducer calibrating assembly that this alignment be maintained. To that end, second threaded passage 75 in support coupling 20 is provided so that both couplings may be turned end over end for use with spindle drives and a master transducer housing connector drive having the same diameter as second square recess sockets 70 and 76. The location of second threaded passage 75 from socket 76 assures that the necessary alignment of threaded shaft 26 and the other elements of the torque applying lever assembly 22 will be properly maintained when second sockets 70 and 76 are used in the calibration procedures of the present invention.

FIGS. 5a, 5b, 6a and 6b illustrate further the versatility of the torque and support couplings of the present invention. FIGS. 5a and 5b depict a pair of couplings, torque coupling 110 and support coupling 124, similar to torque coupling 48 and support coupling 20 of FIGS. 1-4. FIGS. 6a and 6b show the same pair of couplings turned end over end. It will be noted that master transducer housing 118 in FIG. 5a is smaller than master transducer housing 134 in FIG. 6a. The sizes of these housing is determined by the sizes of the master transducers contained therein; generally the greater the torque being measured, the larger the size of the master transducer required to calibrate the spindle transducer and, therefore, the larger the housing needed to support the master transducer. The axial length of the torque and support couplings of the present invention has been determined to accomodate both the sizes of commercially avialable master transducer housings and the alignment requirements of the torque applying articulated lever assembly 22 already discussed. To achieve maximum versatility, as shown in FIGS. 5a, b and 6a, b each torque coupling 110 and support coupling 124 include opposed first and second square recess sockets. First sockets 114 and 126 are the same size, while second sockets 116 and 128 are also the same size, but are a different size than first sockets 114 and 126. Typically, first sockets 114 and 126 might accomodate ⅜ inch master transducer connector and spindle drives, while second sockets 116 and 128 would receive one inch drives.

Proper alignment of the torque applying articulated lever assembly 22 is assured by making the distance c from the center of bore 112 in torque coupling 110 to the upper edge of master transducer housing 118 is equal to the distance between the center of threaded passage 132 in support coupling 124 and the upper edge of support coupling 124. If this distance has been correctly determined and spindle drives are inserted in sockets 122 and 126, threaded shaft 26, when threaded through passage 132, will be accurately aligned in the same plane with clamp shaft 24 when it is inserted through bore 112. FIGS. 6a and 6b illustrates how this alignment is maintained when torque coupling 110 and support coupling 124 are flipped over so that second sockets 116 and 128 are on top to receive, respectively, the connector drive 134' of master transducer housing 134 and a spindle drive (not illustrated). The distance from the center of bore 112 in torque coupling 110 to the upper edge of master transducer housing 134 is represented by d, as shown in FIG. 6a. For proper alignment when second socket 128 of support coupling 124 is to be used, the center of threaded passage 130 must be positioned distance d from the upper edge of support coupling 124. FIG. 4 illustrates these distances with the articulated lever assembly 22 in place, wherein a is the distance from the upper edge of support coupling 20 containing socket 72 to the center of threaded passage 74. Distance a is also the distance from the upper edge of master transducer housing 30 to the center of clamp shaft 24. Distance b in FIG. 4 has been determined to be the correct one to maintain proper alignment when torque coupling 48 and support coupling 20 are turned end over end so that smaller second sockets 70 and 76 may be utilized for the calibration procedures described herein.

An additional feature which enhances the versatility of the present invention is illustrated in FIGS. 6a and 6b. Torque coupling 110 and support coupling 124 may be utilized on spindle drives of a different size than the two sizes accomodated by first sockets 114 and 126 and second sockets 116 and 128. This is achieved by the use of extensions 142 and 144. Extension 142 includes on its lower side connector drive 146 which is received by recess 136 in master transducer housing 134 and on its upper side recess 148 which will receive a spindle drive of a smaller size than will recess 136. Likewise, extension 144 includes on its lower side connector drive 150 which is received by second socket 128 in support coupling 124 and on its upper side recess 152 which will receive a spindle drive of the same size as recess 148. It will be appreciated that to maintain the correct alignment of the torque applying articulated lever assembly the axial length of extensions 142 and 144 must be the same. The utilization of extension pieces such as extensions 142 and 144 enables the same calibrating assembly to be used to calibrate the transducers on spindles with many different size drives, thus adding further to the versatility of the present invention.

The operation of the transducer calibrating assembly 2 of the present invention is best understood with reference to FIG. 1. A side panel of machine tool housing 9 is removed, permitting access to the air motor of the spindle on which is mounted the transducer to be calibrated. This air motor is made stationary, typically by pinning, as shown by pin 154 inserted through air motor 4 in FIG. 1. A transducer calibrating assembly 2 comprising master transducer housing 30, torque coupling 48, support coupling 20, threaded shaft 26, slide clamp 28 and clamp shaft 24 is attached to two adjacent spindles 3 and 4. The socket on the upper edge of master transducer housing 30 receives spindle drive 5 and the first socket on support coupling 20 receives spindle drive 5'. Threaded shaft 26 is turned by means of a suitable wrench in the direction of arrow 200, which causes linear movement of threaded shaft 26 in the direction designated by arrow 210, which, in turn, imparts a rotary motion shown by arrow 220 to clamp shaft 24 about the axis of spindle 3. An appropriate torque can be applied by turning threaded shaft 26 to generate the necessary circular motion. Since clamp shaft 24 can be moved axially relative to torque coupling 48 and since slide clamp 28 is adjustable along clamp shaft 24, the distance from the rotational axis of spindle 3 at which the force of threaded shaft 26 is applied to shaft 24 may be widely varied. Thus, shaft 24 and clamp 28 cooperate to form an adjustable moment arm means for varying the moment arm of the torque applied to spindle 3.

Spindle 4 to which support coupling 20 is attached absorbs the reactive force. The display readout display 36 on sensing circuit 32 will show the torque applied to spindle 3 as measured by the master transducer within housing 30. The arrangement and means of attachment of threaded shaft 26 and clamp shaft 24 in the transducer calibrating assembly 2 assure that this torque can be very carefully controlled and maintained throughout the calibration procedure. If the two readings on the readout displays 16 and 36 of sensing circuits 10 and 32 are not substantially identical as the known torque is varied over a normal operating range, appropriate adjustments can be made to the measuring circuitry such as by means of variable gain resistor 156 and variable span resistor 158. Of course other types of calibration adjustments could be used. Once the two readings track one another, the spindle transducer will have been calibrated properly, and the calibrating assembly can be moved to another spindle. The means whereby threaded rod 26 and clamp shaft 24 are connected to slide clamp 30 provides maximum flexibility in the application of the calibrating assembly and allows for its use in many different multiple spindle machine tools where the spindles are separated by widely varying distances. The ready adaptability of the assembly of the present invention to different size spindle drives also adds measurably to the versatility of the subject invention.

INDUSTRIAL APPLICABILITY

The transducer calibrating assembly of the present invention is useful in calibrating the spindle transducers in a wide variety of multiple spindle machine tools and offers advantages not heretofore available from existing calibration equipment. The actual transducer calibration assembly is small enough to be conveniently moved from spindle to spindle and can be assembled from easily machined components. More importantly, the operation of the assembly requires no costly and time consuming dismantling and reassembling of the machine tool. Removal of machine side panels is generally all that is required to gain sufficient access to the spindle air motors to allow them to be pinned. The problems inherent in removing the spindles, calibrating the transducers and reinstalling the spindles are absent, since the spindles remain in place while the transducers are calibrated.

Other aspects, objects and advantages of this invention can be obtained from a study of the drawings, the disclosure and the appended claims.

We claim:

1. Apparatus for calibrating a torque measuring transducer mounted on a transducer supporting spindle within a machine tool having a plurality of spindles arranged adjacent one another, said apparatus comprising (a) a torque coupling means for attachment to the transducer supporting spindle and for applying a torque to the transducer supporting spindle, said torque coupling means including a master transducer means for measuring the actual amount of torque being applied to the torque supporting spindle;

(b) support coupling means for connection with a spindle adjacent the transducer supporting spindle and for transferring reactive forces resulting from application of a torque to the transducer supporting spindle to the adjacent spindle; and (c) torque control means connected with said torque coupling means and with said support coupling means for controlling the amount of torque applied to the transducer supporting spindle by said torque coupling means and for holding the applied torque at a fixed level to permit comparison of the output of the master transducer and the transducer being calibrated.

2. Apparatus as claimed in claim 1, wherein said torque control means comprises an articulated lever assembly.

3. Apparatus as defined in claim 2, wherein said support coupling contains a threaded bore, and wherein said articulated lever assembly includes a threaded shaft received within said threaded bore of said support coupling and said articulated lever assembly further includes adjustable moment arm means for varying the moment arm of the torque applied by said torque coupling means.

4. Apparatus as defined in claim 3, wherein said adjustable moment arm means includes a clamp shaft slidably received in said torque coupling means and a slide clamp means for hingedly connecting said threaded and clamp shafts and for permitting the point of connection between said threaded and clamp shafts to be moved axially along said clamp shaft.

5. Apparatus as claimed in claim 1, for use with spindless having downwardly projecting drives, wherein said torque coupling means includes opposed first and second socket means for receiving the downwardly projecting drives.

6. Apparatus as claimed in claim 5, wherein said opposed first and second socket means are different sizes.

7. Apparatus as claimed in claim 5, wherein said torque coupling means further includes a cylindrical bore therethrough.

8. Apparatus as claimed in claim 5, wherein said support coupling means includes opposed first and second socket means for receiving downwardly projecting spindle drives.

9. Apparatus as claimed in claim 8, wherein said opposed first and second socket means are different sizes.

10. Apparatus as claimed in claim 3, wherein said support coupling means further includes a pair of threaded bores for receiving said threaded shaft.

11. Apparatus as claimed in claims 5 and 8, wherein said first and second socket means are the same size.

12. Apparatus as claimed in claims 5 and 8, wherein said second socket means are the same size which is different from the size of said first socket means.

13. A method for calibrating a torque measuring transducer mounted on a transducer supporting spindle within a machine tool having a plurality of spindles arranged adjacent one another, said method comprising the steps of
 (a) applying a torque to the transducer supporting spindle;
 (b) measuring the actual amount of torque being applied to the torque supporting spindle;
 (c) transferring reactive forces resulting from step (a) to a spindle adjacent the spindle to which the torque of step (a) is applied;
 (d) controlling the amount of torque applied to the transducer supporting spindle; and
 (e) holding the applied torque at a fixed level to permit comparison of the results of step (b) with the output of the transducer being calibrated.

14. Apparatus for calibrating a torque measuring transducer mounted on a transducer supporting spindle within a machine tool having a plurality of spindles arranged adjacent one another, said apparatus comprising
 (a) a torque coupling means for attachment to the transducer supporting spindle and for applying a torque to the transducer supporting spindle, said torque coupling means including a master transducer means for measuring the actual amount of torque being applied to the torque supporting spindle;
 (b) support coupling means for connection with the machine tool and for transferring reactive forces resulting from application of a torque to the transducer supporting spindle by said torque coupling means onto the machine tool; and
 (c) torque control means connected with said torque coupling means and with said support coupling means for controlling the amount of torque applied to the transducer supporting spindle by said torque coupling means and for holding the applied torque at a fixed level to permit comparison of the output of the master transducer means and the transducer being calibrated.

* * * * *